US010731878B2

(12) United States Patent
Aggarwal et al.

(10) Patent No.: US 10,731,878 B2
(45) Date of Patent: Aug. 4, 2020

(54) THERMAL COOLING OF AN ENCLOSURE

(71) Applicant: International Business Machines Corporation, Armonk, NY (US)

(72) Inventors: Ayushmaan Aggarwal, Yorktown Heights, NY (US); Bishwaranjan Bhattacharjee, Yorktown Heights, NY (US); Niharika Bhattacharjee, Yorktown Heights, NY (US); Aadi Gupta Bhattacharya, Yorktown Heights, NY (US); Raka Bose, Yorktown Heights, NY (US); Anshul Gupta, Yorktown Heights, NY (US); Deepta Bhattacharya Gupta, Yorktown Heights, NY (US); Renuka Muralidhar, Yorktown Heights, NY (US); Elina Rani, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 15/821,330

(22) Filed: Nov. 22, 2017

(65) Prior Publication Data
US 2019/0154282 A1 May 23, 2019

(51) Int. Cl.
*F24F 5/00* (2006.01)
*C09K 5/06* (2006.01)
(Continued)

(52) U.S. Cl.
CPC .......... *F24F 5/0021* (2013.01); *B60H 1/005* (2013.01); *B60H 1/00978* (2013.01); *C09K 5/06* (2013.01);
(Continued)

(58) Field of Classification Search
CPC .... F24F 5/0021; F24F 5/0042; F24F 2110/10; B60H 1/00478
See application file for complete search history.

(56) References Cited

U.S. PATENT DOCUMENTS 3,732,702 A * 5/1973 Desch ................. A47B 67/005
62/3.6
4,007,600 A * 2/1977 Simms ..................... F25B 21/02
62/3.6
(Continued)

FOREIGN PATENT DOCUMENTS

WO WO-2017216147 A1 * 12/2017 ............ F24F 5/0021

OTHER PUBLICATIONS

Mel, et al. "The NIST Definition of Cloud Computing". Recommendations of the National Institute of Standards and Technology. Nov. 16, 2015.

*Primary Examiner* — Nelson J Nieves
(74) *Attorney, Agent, or Firm* — L. Jeffrey Kelly, Esq.; McGinn IP Law Group, PLLC

(57) ABSTRACT

A computer-implemented mitigation and warning method, system, and computer program product including detecting an enclosure temperature via an enclosure temperature probe and activating, via a controller, a thermoelectric device when the enclosure temperature exceeds a predetermined threshold temperature to transfer heat between an enclosure and a phase change material (PCM) to cause the PCM to change phase and cool the enclosure.

19 Claims, 5 Drawing Sheets

(51) Int. Cl.
  *B60H 1/00* (2006.01)
  *G08B 21/18* (2006.01)
  *G08B 21/22* (2006.01)

(52) U.S. Cl.
  CPC .......... *F24F 5/0042* (2013.01); *G08B 21/182* (2013.01); *G08B 21/22* (2013.01); *B60H 1/00478* (2013.01); *B60H 1/00742* (2013.01); *B60H 1/00878* (2013.01)

(56) References Cited

U.S. PATENT DOCUMENTS

| | | | | |
|---|---|---|---|---|
| 4,326,383 A | * | 4/1982 | Reed | F25B 21/02 62/3.62 |
| 4,383,414 A | * | 5/1983 | Beitner | F25B 21/02 62/3.6 |
| 4,400,948 A | * | 8/1983 | Moorehead | F24F 5/0042 62/3.3 |
| 4,627,242 A | * | 12/1986 | Beitner | F25B 21/02 62/3.6 |
| 4,738,113 A | * | 4/1988 | Rudick | F25B 21/02 62/3.5 |
| 5,277,030 A | * | 1/1994 | Miller | A61B 18/02 607/104 |
| 5,505,046 A | * | 4/1996 | Nelson | F25B 21/02 165/236 |
| 5,522,216 A | * | 6/1996 | Park | F25B 21/02 62/3.6 |
| 5,901,572 A | * | 5/1999 | Peiffer | B60H 1/00 165/104.12 |
| 6,158,224 A | * | 12/2000 | Hu | F24F 3/14 62/3.4 |
| 6,666,032 B1 | * | 12/2003 | Rickson | A61J 1/165 62/3.6 |
| 6,715,299 B2 | * | 4/2004 | Kim | A45D 44/00 62/3.6 |
| 8,418,477 B2 | | 4/2013 | Klein et al. | |
| 9,555,686 B2 | | 1/2017 | Ranalli et al. | |
| 2002/0043068 A1 | * | 4/2002 | Carr | F24F 5/0017 62/3.7 |
| 2003/0221717 A1 | * | 12/2003 | Dessel | F24F 5/0042 136/206 |
| 2005/0055990 A1 | * | 3/2005 | Choi | F24F 3/16 55/487 |
| 2005/0081556 A1 | * | 4/2005 | Kim | F24F 3/16 62/411 |
| 2006/0102353 A1 | | 5/2006 | Storm et al. | |
| 2007/0193278 A1 | * | 8/2007 | Polacek | A61F 7/10 62/3.2 |
| 2009/0130965 A1 | | 5/2009 | Galvez-Ramos | |
| 2010/0050666 A1 | * | 3/2010 | Meyer | B01D 53/261 62/94 |
| 2010/0274396 A1 | * | 10/2010 | Yang | B60H 1/00385 700/278 |
| 2010/0281884 A1 | | 11/2010 | Rawski et al. | |
| 2012/0085105 A1 | * | 4/2012 | Quisenberry | B60H 1/00478 62/3.2 |
| 2012/0085231 A1 | * | 4/2012 | Kristensson | F24F 3/1607 95/14 |
| 2012/0152511 A1 | * | 6/2012 | Chang | B60H 1/00428 165/202 |
| 2013/0192271 A1 | * | 8/2013 | Barnhart | F25B 21/04 62/3.3 |
| 2014/0290301 A1 | * | 10/2014 | Law | F24F 5/0042 62/404 |
| 2014/0318152 A1 | * | 10/2014 | Ghoshal | F25B 21/02 62/3.2 |
| 2015/0075186 A1 | | 3/2015 | Prajapati | |
| 2015/0159924 A1 | * | 6/2015 | Calderon | F25D 11/006 62/3.6 |
| 2016/0205761 A1 | * | 7/2016 | Dede | H01L 23/36 361/717 |
| 2016/0290684 A1 | * | 10/2016 | Lee | F24F 5/0042 |
| 2016/0368458 A1 | * | 12/2016 | Oh | F24F 5/0042 |
| 2017/0003041 A1 | * | 1/2017 | Kim | F24F 3/153 |
| 2017/0135884 A1 | * | 5/2017 | Lachenbruch | A61G 13/126 |
| 2017/0320054 A1 | * | 11/2017 | Crum | B01L 3/502 |
| 2018/0347869 A1 | * | 12/2018 | Boule | F25B 21/02 |
| 2019/0063412 A1 | * | 2/2019 | Strano | F03G 7/06 |

* cited by examiner

THERMAL COOLING OF AN ENCLOSURE

BACKGROUND

The present invention relates generally to a mitigation and warning method, and more particularly, but not by way of limitation, to a method, a computer program product, a system, and an apparatus to control (e.g., warn and/or mitigate) a temperature inside an enclosure (e.g., a container) for a duration using Phase change material (PCM) as a heat sink for a thermoelectric based cooling system.

The temperature inside an enclosure, for example, a parked car can increase very quickly even on a mild day. With an outside temperature of 65° F., the temperature inside a car after just one hour can reach 108° F. This then may turn fatal for any occupants in the car. For example, a German Shepherd can withstand temperatures of up to 90° F. to 95° F. Every year hundreds of pet fatalities and children fatalities occur due to being stuck in cars (or similar enclosure) in the USA and many more are injured. High temperatures is also detrimental to electronic devices (on or off) which may be present in the enclosure. One could also desire to control temperature in an enclosure when hazardous chemicals are stored.

SUMMARY

In an exemplary embodiment, the present invention provides a computer-implemented mitigation and warning method, the method including detecting an enclosure temperature via an enclosure temperature probe and activating, via a controller, a thermoelectric device when the enclosure temperature exceeds or is predicted to exceed a predetermined threshold temperature to transfer heat between an enclosure and a phase change material (PCM) to cause the PCM to change phase and cool the enclosure.

One or more other exemplary embodiments include a computer program product and a system.

The above summary will be described in more detail below with reference to the drawings. The invention is capable of embodiments in addition to those described and of being practiced and carried out in various ways. It is thus to be understood that the invention is not limited in its application to the details of construction and to the arrangements of the components set forth in the following description or illustrated in the drawings. Also, it is to be understood that the phraseology and terminology employed herein, as well as the abstract, are for the purpose of description and should not be regarded as limiting.

As such, those skilled in the art will appreciate that the present invention may readily be utilized as a basis for the designing of other structures, methods and systems for carrying out the several purposes of the present invention. It is important, therefore, that the claims appended hereto be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
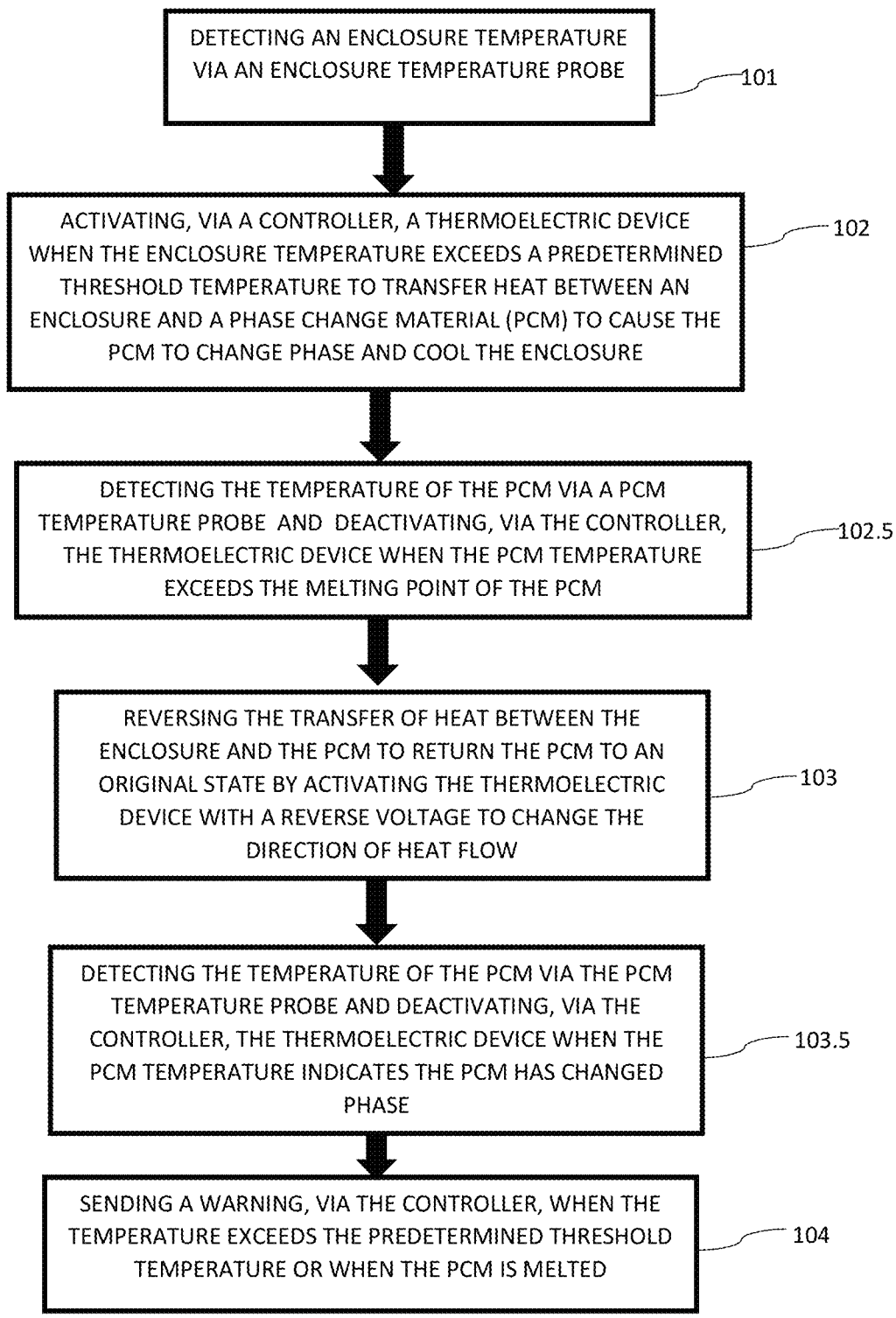
FIG. 1 depicts a high-level flow chart for a computer-implemented mitigation and warning method, according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, a mitigation and warning method 100 according to an embodiment of the present invention includes various steps which helps control a temperature inside an enclosure (e.g., a parked car, a room, an electronic device casing, etc.) for a duration using a phase change material (PCM) as a heat sink for a thermoelectric-based cooling system. The PCM changing phases can be powered by a secondary battery (or a primary battery of a device) which is kept charged, for example, from electric outlet in room or vehicle runs. The thermoelectric system can be triggered when motion is detected in a parked car or smoke is detected when storing hazardous chemicals or temperature exceeds or is expected to exceed a threshold. This is complemented by a warning which can send alerts to the owner as well as emergency authorities to warn about the situation. It is noted that although the embodiments described herein generally describe a mitigation then a warning, the invention is not limited thereto. That is, a second embodiment in which a warning is transmitted first (e.g., at a predetermined temperature value before the mitigation would activate) can be included. In this manner, the mitigation does not always need to activate, and the warning can prevent the necessity for mitigation.

Figure 2:
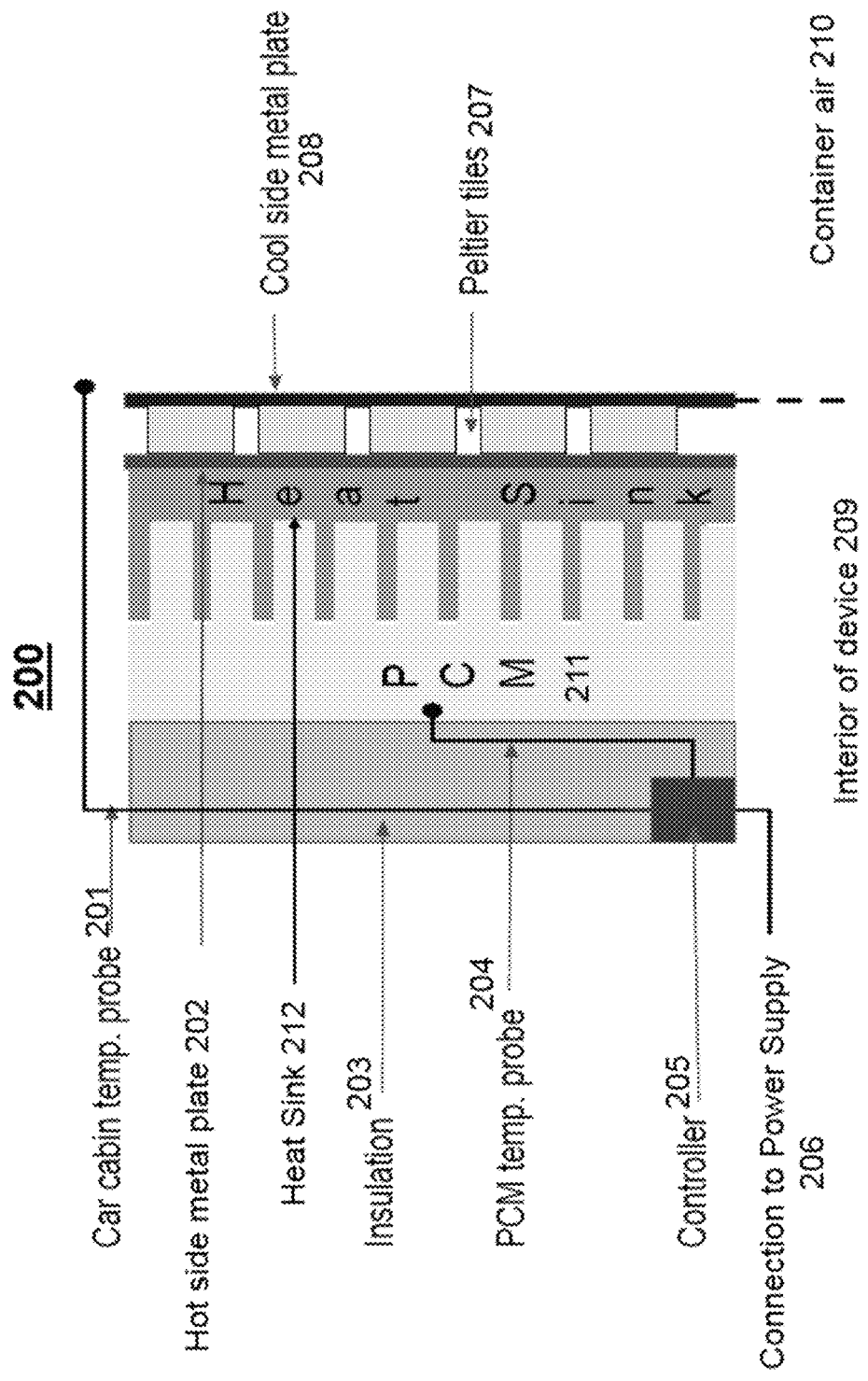
FIG. 2 exemplarily depicts a thermal cooling apparatus 200 according to an embodiment of the present invention.

With reference to FIG. 2, a thermal cooling apparatus 200 includes a PCM 211 disposed between an insulation material 203 and a heat sink 212. A hot side metal plate 202 is disposed on an outer side of the heat sink 212 opposite the PCM 211. Thermoelectric devices (e.g., Peltier tiles) 207 are disposed contacting the hot side metal plate 202 on the outer side, and a cool side metal plate 208 is disposed on an exterior surface (i.e., outermost side) of the Peltier tiles 207 and is exposed to container air 210. A controller 205 is disposed inside the insulation material 203. An enclosure temperature probe 201 is connected to the controller 205 and the measurement section of the temperature probe is disposed to take a temperature of the enclosure air 210. The controller 205 is connected to an external power supply 206 (e.g., a battery source charging the apparatus 200). Also, a PCM temperature probe 204 is connected between the controller 205 and the PCM 211 for taking a temperature of the PCM 211. It is noted that each element of the device is located on an interior of the device 209 with only an outer side of the cool side metal plate 208 being exposed to the enclosure air 210. In this manner, the apparatus 200 is scalable. It is to be noted that plates 202 and 208 and heat sink 208 make heat transfer efficient and one could build the system without them.

The PCM 211 can be, for example, a substance with a high heat of fusion which, melts and solidifies at a certain temperature, that is capable of storing and releasing large amounts of energy. Heat is absorbed (or released) when the material changes from solid to liquid (and vice versa).

The PCM 211 includes a configurable melting temperature in a desired operating temperature range based on a selected material, a high latent heat of fusion per unit volume, a high specific heat, high density and high thermal conductivity, a small volume changes on phase transformation and small vapor pressure at operating temperatures to reduce the containment problem, congruent melting properties, kinetic properties, a high nucleation rate to avoid supercooling of the liquid phase, a high rate of crystal growth, so that the system can meet demands of heat recovery from the storage system (i.e., reversal as discussed in step 104), complete reversible freeze/melt cycle, limited degradation after a large number of freeze/melt cycle, non-corrosiveness, non-toxic, non-flammable and non-explosive materials, and economic properties such as low cost and availability. That is, the PCM 211 selected is highly customizable and is based on the type/size/design constraints of the enclosure. As a necessity, the PCM 211 selected must be able to perform a complete reversible freeze/melt cycle for reusability.

Moreover, it is noted that the PCM material is selected based on a melting point (e.g., phase change point) of the PCM 211. For example, the PCM 211 is preferably selected to have a melting point higher than a temperature of the enclosure air 210 at which the PCM 211 is activated. That is, with the PCM 211 having a melting point higher than the required temperature of danger, it is ensured that the PCM 211 does not melt prematurely and retains its full heat absorbing capacity when it needs to be activated. When activated, the temperature of the hot side 202 of the thermoelectric device will increase above the melting point of the PCM 211 and the temperature of the cold 208 side will be substantially below the critical temperature of the enclosure air 210, thus transferring heat from the enclosure air 210 to the PCM 211 before the critical temperature is reached.

Regarding the Peltier tiles 207, the Peltier tiles 207 can perform a thermoelectric effect for a direct conversion of electric voltage to temperature gradient. The role of hot 202 and cold 208 sides is reversible. That is, based on a signal from the controller 205, the Peltier tiles 207 can to cause the PCM 211 to either freeze or melt to mitigate the temperature of the enclosure air 210. Thus, the polarity of the voltage applied to the Peltier tiles 207 determines the direction of the temperature gradient.

The Peltier tiles 207 change the temperature of PCM 211 because the direction of heating and cooling is determined by the polarity of the applied voltage, thermoelectric devices can be used as temperature controllers.

The controller 205 can include a motion detection sensor (e.g., to detect an animate object such as an animal or a human), a weight detection sensor, a smoke sensor, a wireless transmitter, etc. That is, the controller 205 can selectively activate the apparatus 200 not only based on the temperature of the enclosure but also if the enclosure includes, for example, a passenger (i.e., an animal, person, etc. in a vehicle) via motion or weight detection and also can be turned on/off remotely by a user via a wireless transmitter. Moreover, the wireless transmitter can communicate with a third party receiver (i.e., user mobile phone, emergency personnel, etc.).

Thus, when the enclosure air 210 reaches a predetermined temperature as detected via the enclosure (e.g., container/cabin) temperature probe 201, the controller 205 activates the Peltier tiles 207 to transfer heat from the enclosure air 210 to the heat sink 212 which causes the PCM 211 to change states. Thereby, the cool side metal plate 208 will emit the cooler temperature of the PCM 211 as the PCM 211 melts (i.e., lowers the temperature to cool the enclosure air). Conversely, when the temperature of the enclosure air 210 is mitigated, the controller 205 reverses the process and causes the PCM 211 to change back to a solid state by drawing in the heat from the PCM 211 to return it to the solid state.

Referring now to FIG. 1 and generally to the structural elements of FIG. 2, the mitigation and warning method 100 can control the apparatus 200 to perform a mitigation and/or warning function.

In step 101, an enclosure temperature (e.g., a temperature of the enclosure air 210) is detected via an enclosure temperature probe 201. Further, in step 101, additional sensors connected to the controller can be activated such as, for example, a smoke sensor or a motion sensor to determine if a user is in the enclosure (i.e., will not activate if no user present), a weight sensor connected to a seat in the enclosure to determine if a user is present (i.e., a child in a car seat may be asleep and not "moving" but the difference in weight of the car seat with and without the child can be detected), etc. That is, additional factors can be detected in step 101 to determine whether to activate the PCM 211/Peltier tiles 207 on top of just temperature. Optionally, a warning may be set to the user or other personnel.

In step 102, a Peltier tile 207 is activated when the enclosure temperature exceeds a predetermined threshold temperate to transfer heat between an enclosure (e.g., container air 210) and the apparatus 200. The controller 205 activates the Peltier tiles 207 to facilitate the transfer of heat between the enclosure and the apparatus 200 to cool the enclosure. The predetermined threshold temperature is set less than a melting point (e.g., phase change point) of the PCM and less than a critical temperature of the enclosure. That is, the cooling process is started by the controller even before a temperature is reached that can cause danger to an individual in the enclosure. For example, if a critical danger range of a vehicle interior temperature is 95° F., a mitigation process of starting the cooling process by the apparatus 200 can start when the enclosure air 210 reaches 80° F., or a temperature less than the critical temperature. In this manner, the rise in temperature can be mitigated prior to reaching the dangerous temperatures thus allowing for longer response times by emergency personal or the owner of the enclosure (as discussed later).

In step 102.5, the temperature of the PCM is detected via a PCM temperature probe and deactivating, via the controller, the thermoelectric device when the PCM temperature exceeds the melting point of the PCM.

In step 103, once the mitigation process is finished and the situation has been alleviated (i.e., a person inside a vehicle is removed), the transfer of heat between the enclosure and the PCM is reversed causing the PCM 211 to return to a solid state for a next time that step 102 activates the cooling process. In other words, the Peltier tiles 207 activate a reverse current causing heat from the PCM 211 to be transferred to the enclosure air 210 in order to "freeze" or "return the PCM 211 to a solid state". The PCM is returned to the original state with a reverse voltage change to the direction of heat flow.

In step 103.5, the temperature of the PCM is detected via the PCM temperature probe and the thermoelectric device is deactivated, via the controller, when the PCM temperature indicated the PCM has changed phase to solid.

In step 104, a warning is sent, via the controller, when the temperature exceeds the predetermined threshold temperature and the apparatus 200 has been activated. Thus, not only can the temperature rise of the enclosure be mitigated by the apparatus 200, the controller 205 can additionally or alternatively send a warning to the owner the enclosure, emergency personnel, etc. in order to prevent any further issue from occurring. In other words, the apparatus 200 can mitigate the temperature rise only for some time and the warning allows human intervention to stop the need for the mitigation act and assist the person/animal inside an enclosure if required.

The method 100 can provide for a method for energy efficient active thermal control in enclosed spaces (i.e., containers). The method can use the PCM 211 as the cooling device with Peltier tiles 207 as the heat pump to increase the temperature on the PCM even when the enclosed space temperature is below the melting point of the PCM. Further, the method can mitigate temperature rise by active cooling of a parked car, active cooling of a computer or phone in an enclosed space, active cooling of a room with hazardous chemicals stored, etc. Moreover, the method 200 uses the PCM 211 as the heating device with Peltier tiles 207 as the cooling pump to decrease the temperature on the PCM 211 even when the enclosed space temperature is above the melting point of the PCM 211.

Figure 3:
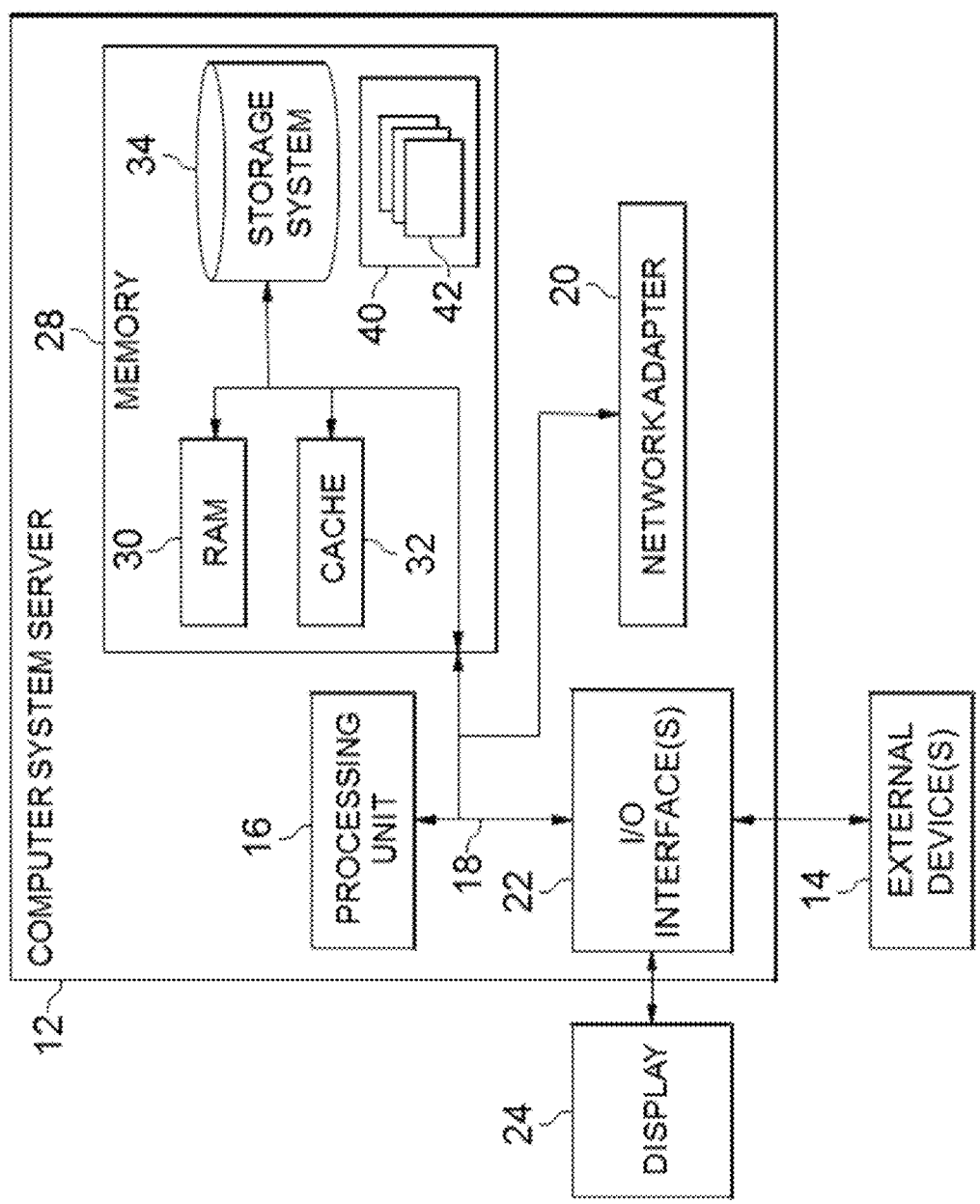
FIG. 3 depicts a cloud computing node according to an embodiment of the present invention.

Referring also now to FIG. 3, one or more computers of a computer system 12 according to an embodiment of the present invention can include a memory 28 having instructions stored in a storage system to perform the steps of FIG. 1 via the controller 205 that can include the memory 28.

As will described/illustrated in more detail below, one or more embodiments of the present invention may be implemented in a cloud environment (see e.g., FIGS. 3-5). It is nonetheless understood that the present invention can be implemented outside of the cloud environment.

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 3 depicts a an example of a computing node in accordance with the present invention. Although computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer server 12 is only one example of a suitable computing node and is not intended to suggest any limitation as to the scope of use or functionality of embodiments of the invention described herein. Regardless, computer server 12 is capable of being implemented and/or performing any of the functionality set forth herein.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in cloud computing environments (see e.g., FIG. 3) where tasks are performed by remote processing circuits that are linked through a communications network. In a distributed cloud computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that operably couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 generally carry out the functions and/or methodologies of embodiments of the invention as described herein.

Computer system/server 12 may also communicate with one or more external devices 14 such as a keyboard, a pointing circuit, a display 24, a camera, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
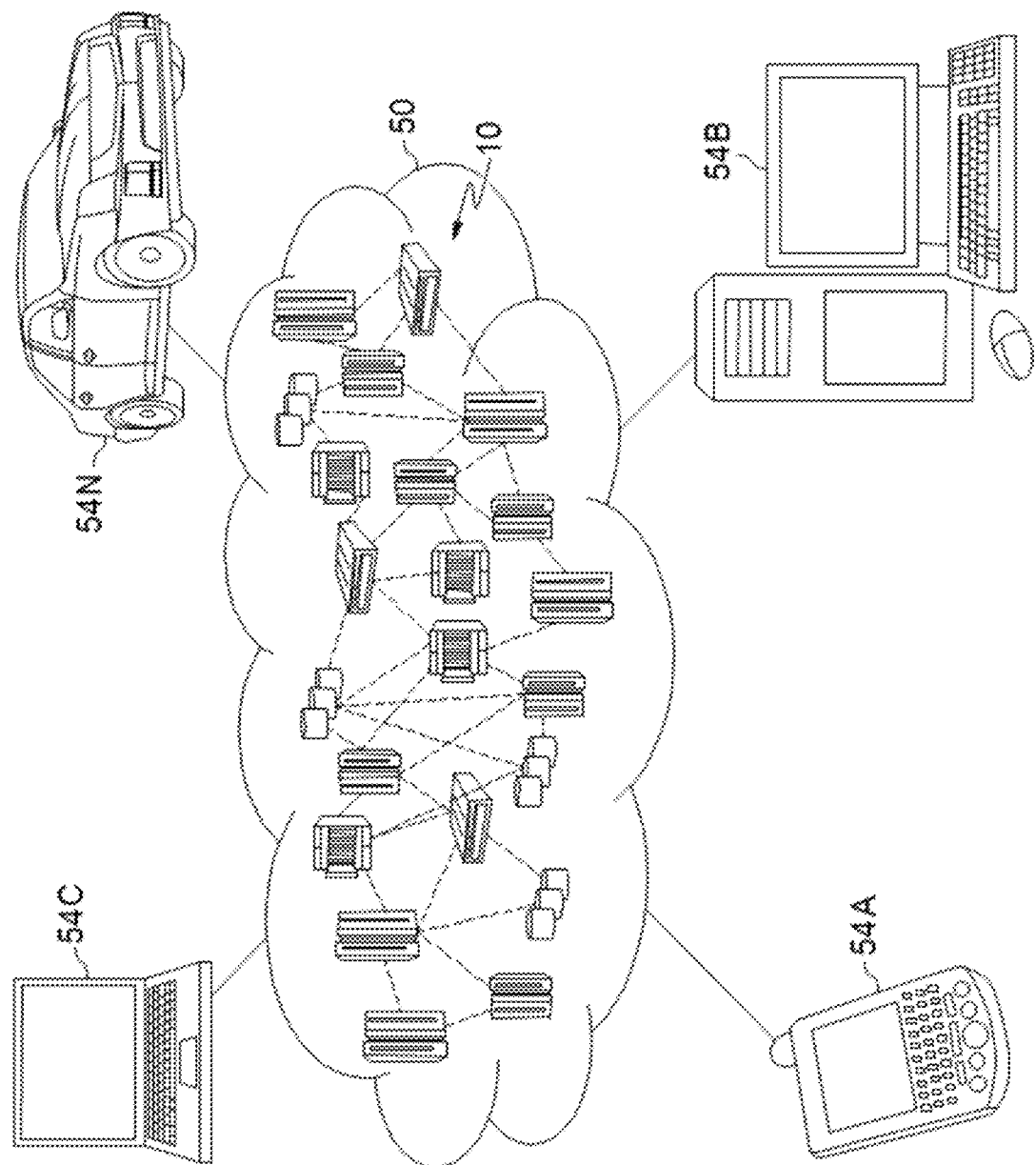
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 (e.g., computer system 12 (FIG. 3) with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
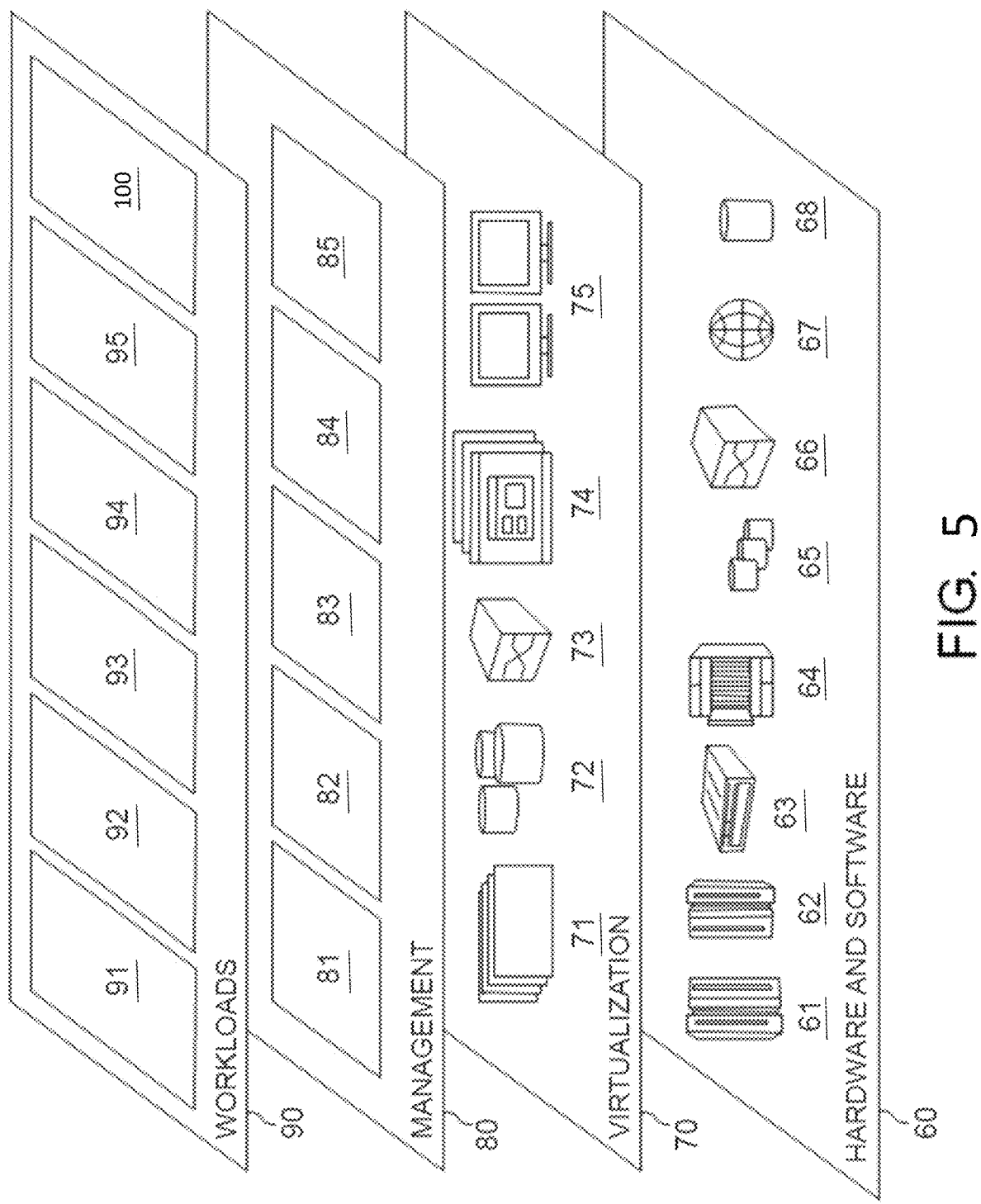
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the mitigation and warning method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented mitigation and warning method, the method comprising:
   detecting an enclosure temperature via an enclosure temperature probe; and
   activating, via a controller, a thermoelectric device of a thermal cooling apparatus to transfer heat between an enclosure and a phase change material (PCM) to cause the PCM to change phase and cool the enclosure when the enclosure temperature exceeds or is predicted to exceed a predetermined threshold temperature,
   wherein the thermal cooling apparatus includes:
      the PCM disposed between an insulation material and a heat sink with a hot side plate disposed on an outer side of the heat sink opposite the PCM,
   wherein the thermoelectric devices are disposed contacting the hot side plate on the outer side,
   wherein a cool side plate comprising a metal plate is disposed on an exterior surface of the thermoelectric device and is exposed from the insulation material to the enclosure, and
   wherein the hot side plate covers an entire surface of the heat sink.

2. The computer-implemented method of claim 1, wherein the predetermined threshold temperature is less than a melting point of the PCM.

3. The computer-implemented method of claim 1, wherein the predetermined threshold temperature is less than a predetermined high temperature of an inside of the enclosure for an occupant.

4. The computer-implemented method of claim 1, further comprising reversing the transfer of heat between the enclosure and the PCM to return the PCM to an original state by activating the thermoelectric device to cause a reversal in polarity of a thermoelectric effect.

5. The computer-implemented method of claim 1, further comprising sending a warning, via the controller, when the temperature exceeds the predetermined threshold temperature.

6. The computer-implemented method of claim 1, wherein the thermoelectric device comprises a Peltier tile, and
   wherein the activating comprises activating the Peltier tile when a motion sensor indicates an occupant is present in the enclosure.

7. The computer-implemented method of claim 1, wherein the activating comprises activating the thermoelectric device prior to a temperature of the enclosure reaching a specific temperature to mitigate a temperature increase of the enclosure.

8. A computer program product, the computer program product comprising a computer readable storage medium having program instructions embodied therewith, the program instructions executable by a computer to cause the computer to perform the method of claim 1.

9. The computer-implemented method of claim 1, wherein the exterior surface is an outermost side of the thermoelectric device, and
   wherein the cool side plate is exposed to air of the enclosure.

10. The computer-implemented method of claim 1, wherein the predetermined threshold temperature is less than a melting point of the PCM,
   wherein the predetermined threshold temperature is less than a predetermined high temperature of an inside of the enclosure for an occupant,
   further comprising:
      reversing the transfer of heat between the enclosure and the PCM to return the PCM to an original state by activating the thermoelectric device to cause a reversal in polarity of a thermoelectric effect;
sending a warning, via the controller, when the temperature exceeds the predetermined threshold temperature,
wherein the thermoelectric device comprises a Peltier tile, and
wherein the activating comprises activating the Peltier tile when a motion sensor indicates an occupant is present in the enclosure.

11. A mitigation and warning system, the system comprising:
a processor, and
a memory operably coupled to the processor, the memory storing instructions to cause the processor to perform:
detecting an enclosure temperature via an enclosure temperature probe; and
activating a thermoelectric device of a thermal cooling apparatus to transfer heat between an enclosure and a phase change material (PCM) to cause the PCM to change phase and cool the enclosure when the enclosure temperature exceeds or is predicted to exceed a predetermined threshold temperature,
wherein the thermal cooling apparatus includes:
the PCM disposed between an insulation material and a heat sink with a hot side plate disposed on an outer side of the heat sink opposite the PCM,
wherein the thermoelectric devices are disposed contacting the hot side plate on the outer side,
wherein a cool side plate comprising a metal plate is disposed on an exterior surface of the thermoelectric device and is exposed from the insulation material to the enclosure, and
wherein the hot side plate covers an entire surface of the heat sink.

12. The system of claim 11, wherein the predetermined threshold temperature is less than a melting point of the PCM.

13. The system of claim 11, wherein the predetermined threshold temperature is less than a predetermined high temperature of an inside of the enclosure for an occupant.

14. The system of claim 11, further comprising reversing the transfer of heat between the enclosure and the PCM to return the PCM to an original state by activating the thermoelectric device to cause a reversal in polarity of a thermoelectric effect.

15. The system of claim 11, further comprising sending a warning, via the controller, when the temperature exceeds or is predicted to exceed the predetermined threshold temperature.

16. The system of claim 11, wherein the activating comprises activating a Peltier tile when a motion sensor indicates an occupant is present in the enclosure.

17. The system of claim 11, wherein the thermoelectric device comprises a Peltier tile, and
wherein the activating comprises activating the Peltier tile when a motion sensor indicates an occupant is present in the enclosure.

18. A thermal cooling apparatus, the apparatus comprising:
a phase change material (PCM) contacting a heat sink;
a thermoelectric device connected to the heat sink for thermally activating the phase change material (PCM) to change a phase; and
a controller configured to perform:
detecting an enclosure temperature via an enclosure temperature probe; and
activating the thermoelectric device of a thermal cooling apparatus to transfer heat between an enclosure and a phase change material (PCM) to cause the PCM to change phase and cool the enclosure when the enclosure temperature exceeds or is predicted to exceed a predetermined threshold temperature,
wherein the thermal cooling apparatus includes:
the PCM disposed between an insulation material and a heat sink with a hot side plate disposed on an outer side of the heat sink opposite the PCM,
wherein the thermoelectric devices are disposed contacting the hot side plate on the outer side,
wherein a cool side plate comprising a metal plate is disposed on an exterior surface of the thermoelectric device and is exposed from the insulation material to the enclosure, and
wherein the hot side plate covers an entire surface of the heat sink.

19. The apparatus of claim 18, wherein the PCM comprises a phase change point greater than the predetermined threshold temperature such that the controller controllably activates the PCM rather than a temperature rise outside the apparatus activating the PCM.

* * * * *